AUTOMATIC EQUALIZER SYSTEM

Filed April 10, 1963 2 Sheets-Sheet 1

United States Patent Office 3,283,063

Patented Nov. 1, 1966

3,283,063

AUTOMATIC EQUALIZER SYSTEM

Masao Kawashima, Yokohama-shi, and Tsukumo Higeta, Kawasaki-shi, Japan, assignors to Fujitsu Limited, Kawasaki, Japan, a corporation of Japan Filed Apr. 10, 1963, Ser. No. 272,024
Claims priority, application Japan, Apr. 11, 1962, 37/14,613
12 Claims. (Cl. 178—5)

Our invention relates to equalizing systems for restoring wave-shapes of signals which have been subjected to distortion during transmission, and particularly to automatically adjustable equalizers for eliminating both phase and amplitude distortions in television signals.

Heretofore passive amplitude equalizing networks and phase equalizing networks have been successful in equalizing a portion of the considerable phase and amplitude distortions generated in band-limited transmission lines outside of the band. However, the precision with which these passive networks operate is limited. Furthermore, passive phase equalizers produce an amplitude distortion hump around their design "pole," as well as equalization errors due to the losses in the passive elements, and attempts to obviate these errors introduce a phase error. Even repetition and refinement of these procedures fail to reduce the error of the transmission characteristic. Also in long-distance transmission systems slight remaining distortions accumulate and as a result of phase equalization would produce a complicated distortion having no corresponding relation between the phase and amplitude characteristics.

Avoiding these disadvantages are equalizers comprised of delay lines having a plurality of sequentially spaced output taps one of which is considered the main output tap and provides the main output signal. The remaining taps are the intermediate output taps, the adjusted signals at the intermediate output taps being added to the signals at the main tap. Considered from the point of view of frequency, this type of equalizer adjusts the amplitude-frequency characteristic and the phase-frequency characteristic independently, on the principle of Fourier analysis. From the point of view of time, it is considered a wave-form equalizer which eliminates wave-form distortion.

However, this type of equalizer requires independent adjustment at each one of the taps to achieve optimum equalization. If the adjustment is to be done automatically, the equipment becomes cumbersome, expensive and correspondingly unreliable unless the number of taps and the length of the delay line is maintained within reasonable limits. However such limitations curtail the operating range and effect of the equalizer.

It is an object of our invention to improve such intermediate tap type equalizers and avoid the above-mentioned deficiencies. Another more particular object is to provide an automatically adjusting intermediate tap type equalizer system having an equalizing range extending beyond that normally expected from the tapped delay line. Specifically, it is an object of the invention to extend the equalization to the low-frequency range. Conversely, it is also an object of the invention to reduce the necessary number of taps.

According to a feature of our invention, we transmit along with the video signal, preferably outside of the signal band width, a pilot wave-form signal which we apply to the intermediate tap delay line of the equalizer together with the signal, and before combining the delayed main signal from the equalizer delay line with the tapped intermediate output signals we equalize the main signal in an auxiliary low-frequency equalizer. We then compare the resulting total intermediate tap equalized wave-form with an ideal wave-form corresponding to the transmitted wave-form and sample the resulting error signal and adjust the output of the taps and the auxiliary low-frequency equalizer according to the sampled error signal.

Other objects, advantages and features of the invention will become obvious from the following detailed description. In order that the present invention may be readily carried into effect, it will now be described with reference to the accompanying drawings, wherein.

Figure 1:
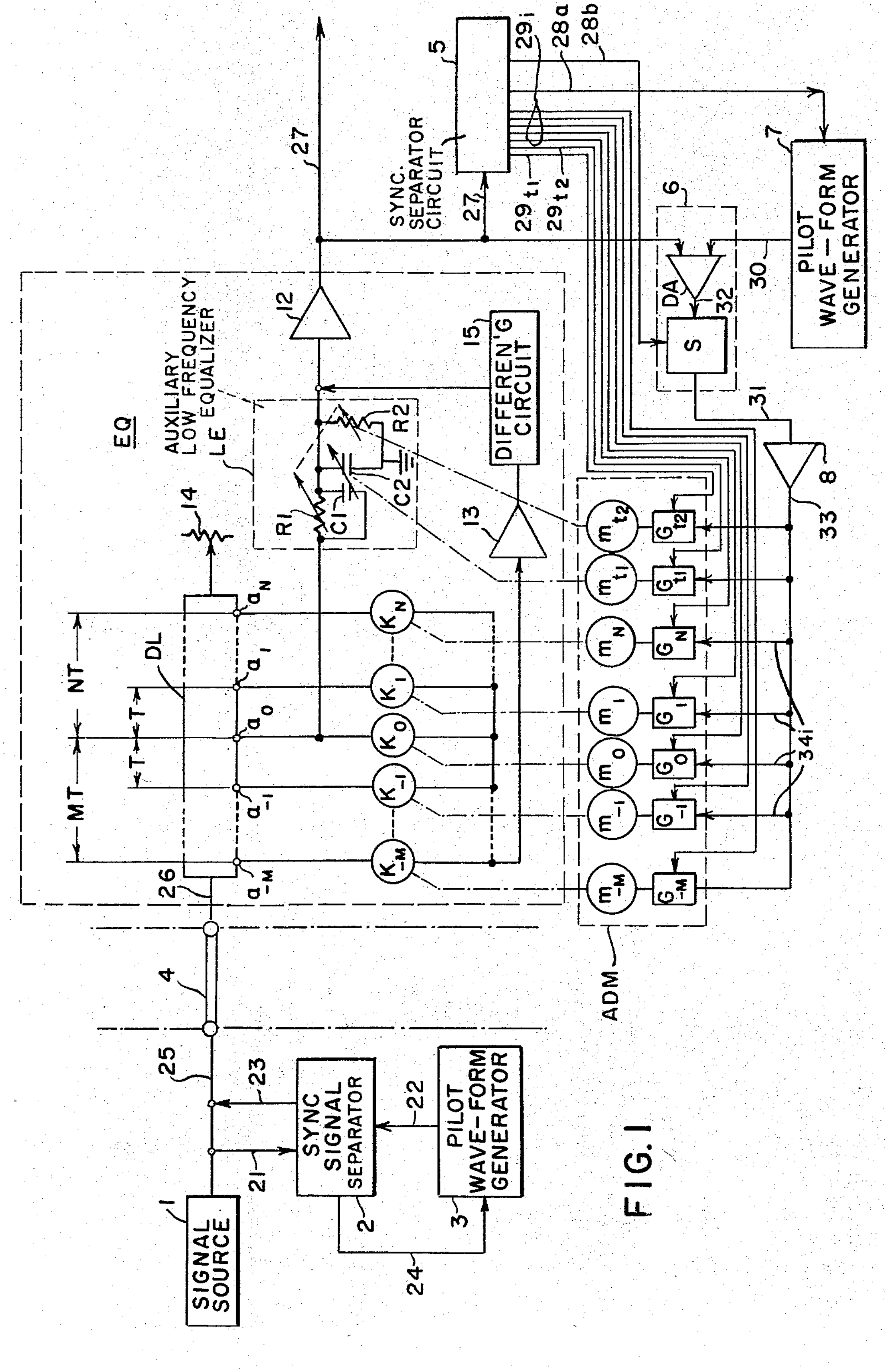
FIG. 1 is a block diagram of an embodiment of the automatic equalizing system of the present invention.

In FIG. 1, a television video signal is generated from a signal source 1 and is applied by means of a line 21 to a sync signal separator 2 which separates the vertical sync signal or horizontal sync signal from the video signal in the line 21. The output of the sync signal separator 2 is transmitted via a line 24 to synchronize a pilot wave-form generator 3 outside the time and wave-form band of the video signal which, for example, may be a vertical blanking signal. The output of the pilot wave-form generator 3, comprised for example of an idealized square wave, is transmitted via a line 22 to the sync signal separator 2. The sync signal separator 2 adds the output of the generator 3 to the output of the video signal source 1 on line 25, via the line 23, but outside the time and wave-form band of the video signal. The composite video signal and pilot wave-form is transmitted via a transmission line 4 of the type which adds distortion to the signal by the time it reaches a receiving line 26 or receiver.

In the receiver the distorted signal is equalized or reconstituted by a differentiated intermediate tap type time equalizer EQ having an output line 27. The equalizer EQ comprises a delay line DL receiving the input signal on line 26. The signal terminates at the end of the delay line at 14 without reflection. Providing plurality of outputs along the delay line at mutually spaced locations separated by a distance $T=\frac{1}{2}fc$, where $fc$ equals the equalizing band width are a plurality of intermediate taps designated $a_i$ ($i$ equals $-M \ldots -1, 0, 1, \ldots N$), the total number of taps being equal to $M+N+1$, M and N being integers and preferably equal. The output signal of the same wave-form as the signal in line 26 except for the time delay MT passes from the tap $a_0$ through an auxiliary low-frequency equalizing device LE to an output amplifier 12.

The outputs at the taps $a_i$ (including $a_0$ of the delay line DL are transmitted to an amplifier 13 by means of respective variable intermediate adjusters $K_i$, where $i$ is as defined above, and are combined in said amplifier. A differentiating circuit 15 transmits the combined intermediate tap signals to the amplifier 12, where they are combined with the main signal from the tap $a_0$ which has been processed by the auxiliary low frequency equalizer circuit LE. The output amplifier 12 supplies the equalized signals to the output line 27 so that the latter carries the equalized video signal, for example horizontal and vertical synchronizing pulses, and an equalized pilot wave-form.

Figure 4:
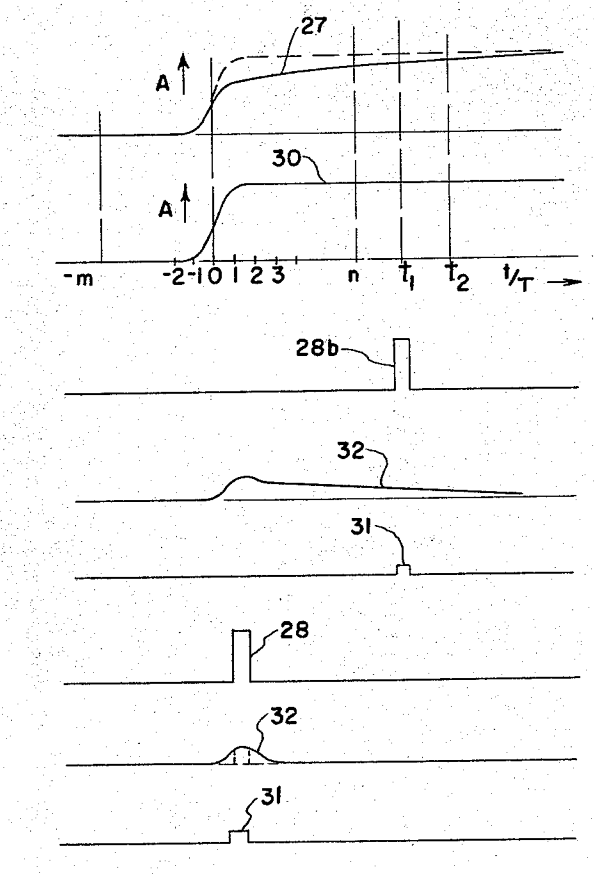
FIG. 4 is a group of time-voltage curves illustrating the response at various points in the circuit of FIG. 1.

Entering a sync separator circuit 5 is a portion of the output signal in the line 27. The sync separator circuit 5 separates the synchronizing information in the equalized output for example the horizontal and vertical synchronizing pulses of a television video signal, and generates two groups of pulses for sweep adjustment. One group of pulse outputs from the sync separator circuit 5 comprises those on lines 28*a* and 28*b*. The signals on line 28*a* consist of separated sync pulses which drive and lock a pilot wave-form generator 7. The pilot wave-form generator 7 generates a standard pilot signal along line 30 corresponding to the pilot signal from generator 3 and synchronized with the equalized pilot signal in the line 27. The equalized pilot wave-form and the desired pilot wave-form are illustrated in FIG. 4 as curves 27 and 30, respectively the numeral designation for the curves in FIG. 4 corresponding to the numerals of the lines which carry the signals.

The line 28*b* transmits a plurality of successive sampling pulses having pulse widths less than the interval T and generated at corresponding sampling points on the pilot signal. The phase or time position of the pulses on line 28*b* is shifted in synchronism with the gating pulses in the other group of lines $29_i$ described hereafter.

As stated, the other pulse group generated by the sync separator circuit 5 is comprised of signals $29_i$ ($i$ equals $-M \ldots -1, 0, 1, \ldots +N$), $29_{t1}$ and $29_{t2}$ which are generated in synchronism with an arbitrarily divided repetition frequency of the pilot signal $fp$. The phases of the respective signals in lines $29_i$ are generated with respective delays of $i/fp\ (M+N+1)k$, where $k$ is an arbitrarily selected integer. The equalized wave-form on line 27, illustrated in FIG. 4 as the curve 27, is also applied to one of two inputs of a differential amplifier DA. Its other input receives signals on the line 30, illustrated in FIG. 4 as curve 30, from the pilot wave-form generator 7. The error signal constitutes the difference between the equalized pilot signal and the ideal pilot signal respectively in line 27 and line 30. The differential amplifier DA forms a part of a comparator circuit 6, the latter comprising also a sampling circuit S for passing the output error signal in differential amplifier DA to an output line 31 each time the sampling circuit S receives a sampling gate signal from line 28*b*. The line connecting the differential amplifier DA and the circuit S is designated 32 and the error signal thereon is illustrated as curve 32 in FIG. 4. The sampled error signal on line 31 is amplified by an amplifier 8 having a narrow band less than $fp\ (M+N+1)k$. The amplified sampled error signal is applied by line 33 to one input of each of a plurality of gate circuits $G_i$, $G_{t1}$ and $G_{t2}$ forming a portion of an adjustment mechanism ADM. The respective gates $G_i$, $G_{t1}$ and $G_{t2}$ are opened by the signals on respective lines $29_i$ which are connected to the corresponding gates. Also included in the adjustment mechanism ADM are a plurality of motors $m_i$, $m_{t1}$ and $m_{t2}$ connected to the corresponding gates so that the respective error signal in line 33 is supplied to the D.C. motors $m_i$ through the respective corresponding gates $G_i$ and lines $34_i$ at appropriate times determined by the lines $29_i$. The motor $m_i$, $m_{t1}$ and $m_{t2}$ control respective adjusters $K_{-M}, \ldots K_{-1}, K_0, K_1, \ldots K_N$. The motors $m_{t1}$ and $m_{t2}$ are connected to and adjust the capacitors C1, C2 and the resistors R1, R2, respectively.

The capacitors C1, C2 and the resistors R1, R2 form part of the low-frequency equalizer LE which is comprised of a jointly adjustable pair of voltage-divider-connected capacitors C1 and C2 connected from the tap $a_0$. The resistor R1 is connected across the capacitor C1 and the resistor R2 is connected across the capacitor C2. The output is taken across the capacitor C2 and the resistor R2. The capacitors are jointly variable so that C1+C2=a constant. The resistors R1 and R2 are jointly variably so that R1/R2 is constant.

The system of FIG. 1 operates as follows. The signal source 1 generates a video signal which is supplied to the line 25. A portion of the signal from the source 1 is transmitted by the line 21 to a sync signal separator 2 for driving and locking the pilot wave-form generator 3. The pilot wave-form generator 3 provides an idealized pilot wave-form that can be added outside the time and wave-form band of the signal and which is transmitted to the line 25 by means of the line 23. The signal and pilot wave-form are transmitted by means of the transmission line 4 to the receiver having the input line 26. At this point, the signal provided at line 25 as well as the pilot wave-form are distorted by the distortion characteristic of the transmission line 4. The distorted video signal and pilot wave-form enter the delay line DL having $M+N+1$ taps spaced a distance corresponding to $T=\frac{1}{2}fc$, where $fc$ is the equalizing band width. The main output is taken from the tap $a_0$ and applied to the amplifier 12 by means of the auxiliary low-frequency equalizer LE. The outputs of all the taps $a_i$ are adjusted by the adjusters $K_i$ and added together before being amplified in the amplifier 13 and the differentiating circuit 15. The main signal is then added to the intermediate signals and supplied to the output by the amplifier 12.

Figure 2:
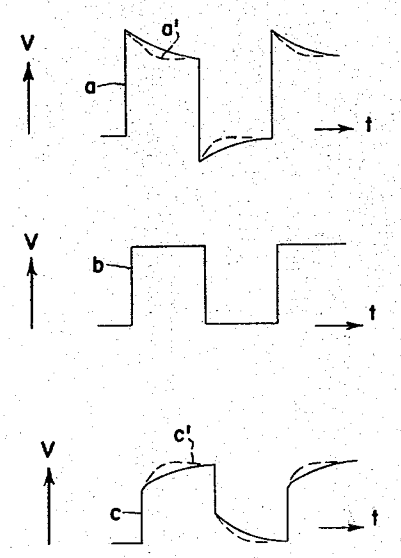
FIG. 2 is a group of time-voltage curves showing the response of a subcombination comprising the auxiliary low-frequency equalizer in the system of FIG. 1 to rectangular wave-forms.

In the low-frequency equalizer LE, the capacitors are such as to form a differential variable capacitor such that $C1+C2=C0$ where C0 is a constant. The equalizer LE has equalizing characteristics shown in FIG. 2, wherein the curves represent voltage with respect to time. The solid curve $a$ in FIG. 2 represents the response of LE to a rectangular wave-form when $R1=R2$ and C1 is a maximum. The solid curve $b$ in FIG. 2 represents the equalizer LE response where $C1=C2$, the solid curve $c$ representing the response where C1 is minimum. The attenuating effects of the equalizer are in part compensated by the amplification of the amplifier 13. The curves $a$, $b$ and $c$ in FIG. 2 can be altered for the various conditions of C1 and C2 by varying the value of R1 and R2 so as to achieve the characteristic shown in dotted lines by curves $a'$ and $c'$.

Figure 3:
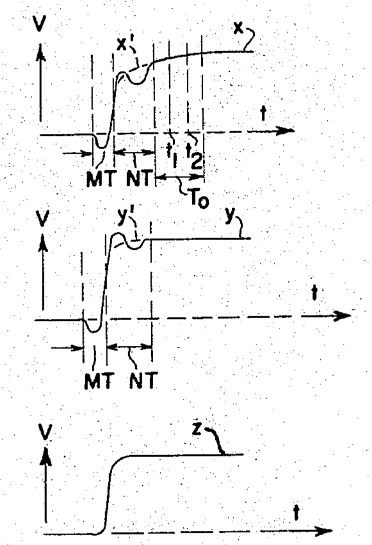
FIG. 3 is a group of curves showing the response of the intermediate tap type equalizer, including the auxiliary equalizer in the system of FIG. 1, to rectangular wave-forms.

FIG. 3 shows three time-voltage curves $x$, $y$ and $z$ illustrating the distortion equalizing capabilities of the intermediate top equalizer EQ. In FIG. 3, the solid curve $x$ is a sample of a distorted signal corresponding to a square step wave-form appearing in line 26, and at the tap $a_0$, the dotted portion of the curve representing the low-frequency median voltage. The solid voltage curve $y$ represents the curve $x$ after equalization by the equalizer LE, whose effect is greatest upon the low-frequency component of the curve as shown by the dotted line of curve $y$ in FIG. 3. The signals coming from the intermediate taps then equalize the high-frequency humps to produce an output voltage, ideally if the adjusters are properly set, corresponding to the curve $a$ in FIG. 2. Because of the equalizer LE, the remainder of the equalizer EQ is required to be effective only in an equalization range corresponding to the times $MT+NT$ as shown in curve $y$ of FIG. 3, rather than the equalization range $MT+NT+T_0$, as shown by curve $x$. Thus the equalizer LE effectively expands the equalization range of the equalizer EQ.

The particular adjustments of the capacitors and resistors C1, C2 and R1, R2 can be set for the step function of curve $x$ by determining the value of voltage at times $t1$ and $t2$ and adjusting the equalizer LE accordingly. This is accomplished, as will be explained, by the members sync separator circuit 5, the comparator 6 and the adjustment component ADM, which sample the equalized signal or pilot wave-form at times $t1$ and $t2$ outside of the equalization range $MT+NT$ of the intermediate tap equalizer and operate the motors $m_{t1}$, $m_{t2}$. By repetition of this process several times, the output signal may be readily equalized with respect to its low-frequency response. Similarly, the adjustment of members $K_i$ is accomplished by the motors $m_i$.

The advantage of the equalizer LE resides in its ability to extend the equalization range $MT+NT$ of the intermediate tap type equalizer EQ. The intermediate tap type equalizer is sufficient for many applications. However, in television transmission systems there occur many distortions of the minimum phase-shift type where $t>MT$ in time relation, having a comparatively simple form. The simple distortions may have a large absolute value. Of course, such distortions can be equalized by extending the delay line and increasing the number of adjusting intermediate taps. However, the additional required delay length and number of taps render the apparatus cumbersome and complex particularly in view of the type of distortion being equalized beyond the ordinary range. On the other hand, the equalizer LE accomplishes a similar satisfactory result but is less complex, far less expensive, and more reliable.

The sync separator circuit 5 responding to signals from line 27 produces a plurality of pulses. One of them is transmitted by the line 28*a* to the sampling circuit S to open said sampling circuit for a time less than T at each sampling point. The pilot wave-form from the equalizer EQ is then compared with the ideal pilot waveform from the pilot wave-form generator 7 which receives synchronizing signals via the line 28*b* from the sync separator circuit 5. The two are compared in the differential amplifier DA and are transmitted through the circuit S only during the occurrence of sampling pulses. The error signal is then amplified by the amplifier 8 and applied simultaneously to the gates $G_i$, $G_{t1}$ and $G_{t2}$. The error signals are transmitted through these gates only at sequential times determined by pulses which arrive at the gates in a predetermined order of phase relationship from the sync separator circuit 5 by the lines $\mathbf{29}_i$, $\mathbf{29}_{t1}$ and $\mathbf{29}_{t2}$. The pulses from the sync separator circuit 5 may be applied to the gates in sequential order or in any order which is deemed to be convenient, such as skipping over two and returning one each time. The other pulses at these particular intervals then actuate the D.C. motors $m_i$, $m_{t1}$ and $m_{t2}$ so as to control the adjusters $K_i$, and the capacitors and resistors of the equalizer LE. This loop circuit serves to continuously readjust the equalizer so that the error signal is reduced to a minimum.

We claim:

1. A system, comprising signal transmitting means including means for producing a main signal; first pilot waveform generating means for producing a pilot waveform outside the time and waveform of said main signal; and transmitting means for transmitting said pilot waveform together with said main signal through a transmitting medium; and waveform equalizing receiver means for said transmitting means, said waveform equalizing receiver means comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, second pilot waveform generating means synchronized with the pilot waveform produced by said first pilot waveform generating means for producing an output pilot waveform corresponding to the transmitted pilot waveform produced by said first pilot waveform generating means comparator means having an input connected to said output line and an input connected to said second pilot waveform generating means for comparing the output waveform of said waveform equalizing means with the output waveform of said second pilot waveform generating means and for producing an error signal corresponding to the difference between said inputs, and correction means responsive to the error signal of said comparator means and coupled between said comparator means and said adjusting means and said low-frequency equalizer for adjusting said adjusting means and said low frequency equalizer.

2. A system, comprising signal transmitting means including means for producing a main signal; first pilot waveform generating means for producing a pilot waveform outside the time and waveform of said main signal; and transmitting means for transmitting said pilot waveform together with said main signal through a transmitting medium; and waveform equalizing receiver means for said transmitting means, said waveform equalizing receiver means comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, second pilot waveform generating means synchronized with the pilot waveform produced by said first pilot waveform generating means for producing an output pilot waveform corresponding to the transmitted pilot waveform produced by said first pilot waveform generating means, comparator means having an input connected to said output line and an input to said second pilot waveform generating means for comparing the output waveform of said waveform equalizing means with the output waveform of said second pilot waveform generating means and for producing an error signal corresponding to the difference between said inputs, and correction means responsive to the error signal of said comparator means and coupled between said comparator means and said adjusting means and said low-frequency equalizer for adjusting said adjusting means and said low frequency equalizer, said low-frequency equalizer including a pair of resistors forming a voltage divider and capacitor means connected across each of said resistors, said capacitor means being adjustable and ganged so that the total value of capacitance is constant.

3. A system, comprising signal transmitting means including means for producing a main signal; first pilot waveform generating means for producing a pilot waveform outside the time and waveform of said main signal; and transmitting means for transmitting said pilot waveform together with said main signal through a transmitting medium; and waveform equalizing receiver means for said transmitting means, said waveform equalizing receiver means comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, second pilot waveform generating means synchronized with the pilot waveform produced by said first pilot waveform generating means for producing an output pilot waveform corresponding to the transmitted pilot waveform produced by said first pilot waveform generating means, comparator means having an input connected to said output line and an input connected to said second pilot waveform generating means for comparing the output waveform of said waveform equalizing means with the output waveform of said second pilot waveform generating means and for producing an error signal corresponding to the difference between said inputs, and correction means responsive to the error signal of said comparator means and coupled between said comparator means and said adjusting means and said low-frequency equalizer for adjusting said adjusting means and said low frequency equalizer, said low-frequency equalizer including a pair of resistors forming a voltage divider and capacitor means connected across each of said resistors, said capacitor means being adjustable and ganged so that the total value of capacitance is constant, said resistors being adjustable jointly in like proportion, said correction means adjusting said capacitor means separately from said resistors.

4. A system, comprising signal transmitting means including means for producing a main signal; first pilot waveform generating means for producing a pilot waveform outside the time and waveform of said main signal; and transmitting means for transmitting said pilot waveform together with said main signal through a transmitting medium; and waveform equalizing receiver means for said transmitter means, said receiver means including delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, second pilot waveform generating means synchronized with the pilot waveform produced by said first pilot waveform generating means for producing an output pilot waveform corresponding to the transmitted pilot waveform produced by said first pilot waveform generating means, comparator means having an input connected to said output line and an input connected to said second pilot waveform generating means for comparing the output waveform of said waveform equalizing means with the output waveform of said second pilot waveform generating means and for producing an error signal corresponding to the difference between said inputs, correction means responsive to the error signal of said comparator means and coupled between said comparator means and said adjusting means and said low-frequency equalizer for adjusting said adjusting means and said low frequency equalizer, and synchronizing means connected to said output line and having a plurality of output leads for producing a gate signal at each of said output leads in succession at times corresponding to the taps on said delay line and at a later time for said low-frequency equalizer means, said correction means including a plurality of gates controlled by the output leads of said synchronizing means and connected to said comparator means for controlling separately each of said adjusting means and said low-frequency equalizer means.

5. A system, comprising signal transmitting means including means for producing a main signal; first pilot waveform generating means for producing a pilot waveform outside the time and waveform of said main signal; and transmitting means for transmitting said pilot waveform together with said main signal through a transmitting medium; and waveform equalizing receiver means for said transmitting means, said waveform equalizing receiver means comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, second pilot waveform generating means synchronized with the pilot waveform produced by said first pilot waveform generating means for producing an output pilot waveform corresponding to the transmitted pilot waveform produced by said first pilot waveform generating means, comparator means having an input connected to said output line and an input connected to said second pilot waveform generating means for comparing the output waveform of said waveform equalizing means with the output waveform of said second pilot waveform generating means and for producing an error signal corresponding to the difference between said inputs, correction means responsive to the error signal of said comparator means and coupled between said comparator means and said adjusting means and said low-frequency equalizer for adjusting said adjusting means and said low frequency equalizer, and synchronizing means connected to said output line and having a plurality of output leads for producing a gate signal at each of said output leads in succession at times corresponding to the taps on said delay line and at a later time for said low-frequency equalizer means, said correction means including a plurality of gates controlled by the output leads of said synchronizing means and connected to said comparator means for controlling separately each of said adjusting means and said low-frequency equalizer means and a plurality of motor means each connected to and responding to a corresponding one of said gate means and each of said motors being connected to a corresponding one of said adjusting means for controlling the corresponding adjusting means.

6. A system, comprising signal producing a main signal; first pilot waveform generating means for producing means including means for transmitting a pilot waveform outside the time and waveform of said main signal; and transmitting means for transmitting said pilot waveform together with said main signal through a band-limited transmitting medium connected to said transmitting means; and waveform equalizing receiver means connected to said transmitting medium, said waveform equalizing receiver means comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, second pilot waveform generating means synchronized with the pilot waveform produced by said first pilot waveform generating means for producing an output pilot waveform corresponding to the transmitted pilot waveform produced by said first pilot waveform generating means, comparator means having an input connected to said output line and an input connected to said second pilot waveform generating means for comparing the output waveform of said waveform equalizing means with the output waveform of said second pilot waveform generating means and for producing an error signal corresponding to the difference between said inputs, correction means responsive to the error signal of said comparator means and coupled between said comparator means and said adjusting means and said low-frequency equalizer for adjusting said adjusting means and said low-frequency equalizer, and synchronizing means connected to said output line and having a plurality of output leads for producing a gate signal at each of said output leads in succession at times corresponding to the taps on said delay line and at a later time thereafter for said low-frequency equalizer means, said correction means including a plurality of gates controlled by the output leads of said synchronizing means and connected to said comparator means for controlling separately each of said adjusting means and said low-frequency equalizer means and a plurality of motor means each connected to and responding to a corresponding one of said gate means and each of said motors being connected to a corresponding one of said adjusting means for controlling said low-frequency equalizer including a pair of resistors forming a voltage divider and capacitor means connected across each of said resistors, said capacitor means being adjustable and ganged so that the total value of capacitance is constant, said resistors being adjustable jointly in like proportion.

7. An equalizer system for equalizing distorted signals received together with a distorted pilot waveform outside the time and waveform of said signals, comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, pilot waveform generating means synchronized with the pilot waveform received by said equalizer system with said distorted signals for producing an output pilot waveform corresponding to the pilot waveform received by said equalizer system, comparator means having an input connected to said output line and an input connected to said pilot waveform generating means for comparing the output waveform of said equalizer system with the output waveform of said pilot waveform generating means and for producing an error signal corresponding to the difference between said inputs, and correction means responsive to the error signal of said comparator means and coupled between said comparator means and said adjusting means and said low-frequency equalizer for adjusting said adjusting means and said low-frequency equalizer.

8. An equalizer system for equalizing distorted signals received together with a distorted pilot waveform outside the time and waveform of said signals comprising delay means, a plurality of intermediate taps on said delay means, a main tap on said delay means, an output line, adjustable low-frequency equalizer means connecting the main tap of said delay means to said output line, a plurality of adjuster means connecting corresponding ones of said intermediate taps to said output line, pilot waveform generating means synchronized with the pilot waveform received by said equalizer system with said distorted signals for producing an output pilot waveform corresponding to the pilot waveform received by said equalizer system, comparator means having an input connected to said output line and an input connected to said pilot waveform generating means for comparing the output waveform of said equalizer system with the output waveform of said pilot waveform generating means and for producing an error signal corresponding to the difference between said inputs, and correction means responsive to the error signal of said comparator means and coupled between said comparator means and said adjusting means and said low-frequency equalizer for adjusting said adjusting means and said low-frequency equalizer and synchronizing means connected to said output line and having a plurality of output leads for producing a gate signal at each of said output leads in succession at times corresponding to the taps on said delay line and at a later time for said low-frequency equalizer means, said correction means including a plurality of gates controlled by the output leads of said synchronizing means and connected to said comparator means for controlling separately each of said adjusting means and said low-frequency equalizer means and a plurality of motor means each connected to and responding to a corresponding one of said gate means and each of said motors being connected to a corresponding one of said adjusting means for controlling the corresponding adjusting means; said low-frequency equalizer including a pair of resistors forming a voltage divider and capacitor means connected across each of said resistors, said capacitor means being adjustable and ganged so that the total value of capacitance is constant, said resistors being adjustable jointly in like proportion.

9. The method which comprises the steps of transmitting signals together with a pilot waveform outside the time and waveform of said signals through a band-limited transmitting medium toward a receiver, in the receiver passing the received signal and pilot waveform through a tapped delay line having a plurality of intermediate taps, an output and adjusting means at the taps, low-frequency equalizing the output at one of the taps of said delay line, simultaneously adjusting the output at all the taps of said delay line and combining the outputs with each other and with the low-frequency equalized output, comparing the resulting waveform with an ideal waveform corresponding to the pilot waveform, and correcting the adjusting means and the low-frequency equalization in response to the resulting error signal.

10. In a broad-band transmission system, an equalization system comprising means for producing a main signal; first pilot waveform generating means for producing a pilot waveform in synchronism with said main signal and providing said pilot waveform outside the time and waveform of said main signal; and waveform equalizing means for receiving and equalizing said main signal, said waveform equalizing means including adjusting means, receiver synchronizing means responding to the equalized signal for producing a synchronized output signal, second pilot waveform generating means responsive to said synchronized output signal for producing an output pilot waveform corresponding to the transmitted pilot waveform, comparator means for comparing the output waveform of said waveform equalizing means with the output waveform of said second pilot waveform generator, and correction means responsive to said comparator means for changing the adjusting means in said waveform equalizing means to produce zero output in said comparator means.

11. In a broad-band transmission system, an equalization system comprising means for producing a main signal; first pilot waveform generating means for producing a pilot waveform in synchronism with said main signal and providing said pilot waveform outside the time and waveform of said main signal; and waveform equalizing means for receiving and equalizing said main signal, said waveform equalizing means including a delay line having a plurality of taps, adjusting means having a plurality of adjusters for said taps and summing means combining the signal from said adjusters with a main signal from one of said taps, receiver synchronizing means responding to the equalized signal for producing a synchronized output signal, second pilot waveform generating means responsive to said synchronized output signal for producing an output pilot waveform corresponding to the transmitted pilot waveform, comparator means for comparing the output waveform of said waveform equalizing means with the output waveform of said second pilot waveform generator, and correction means responsive to said comparator means for changing the adjusting means in said waveform equalizing means to produce zero output in said comparator means.

12. In a broad-band transmission system, an equalization system comprising means for producing a main signal; first pilot waveform generating means for producing a pilot waveform in synchronism with said main signal and providing said pilot waveform outside the time and waveform of said main signal; and waveform equalizing means for receiving and equalizing said main signal, said waveform equalizing means including a delay line having a plurality of taps, adjusting means having a plurality of adjusters for said taps and summing means combining the signal from said adjusters with a main signal from one of said taps, said summing means including differentiating means for the signals from said adjusters, receiver synchronizing means responding to the equalized signal for producing a synchronized output signal, second pilot waveform generating means responsive to said synchronized output signal for producing an output pilot waveform corresponding to the transmitted pilot waveform, comparator means for comparing the output waveform of said waveform equalizing means with the output waveform of said second pilot waveform generator, and correction means responsive to said comparator means for changing the adjusting means in said waveform equalizing means to produce zero output in said comparator means.

References Cited by the Examiner

UNITED STATES PATENTS

| | | | |
|---|---|---|---|
| 1,743,132 | 1/1930 | Green | 179—15 |
| 2,102,138 | 12/1937 | Strieby | 333—18 |
| 2,115,141 | 4/1938 | Eckberg | 333—18 |
| 2,960,571 | 11/1960 | Malthaner | 333—18 |

DAVID G. REDINBAUGH, *Primary Examiner.*

R. L. RICHARDSON, *Assistant Examiner.*